(12) United States Patent
González González

(10) Patent No.: US 8,186,342 B2
(45) Date of Patent: May 29, 2012

(54) SOLAR THERMAL POWER STATION

(75) Inventor: Daniel González González, Santa Úrsula (ES)

(73) Assignee: Guradoor, S.L., San Cristobal De la Laguna (ES)

( * ) Notice: Subject to any disclaimer, the term of this patent is extended or adjusted under 35 U.S.C. 154(b) by 888 days.

(21) Appl. No.: 11/919,892

(22) PCT Filed: Oct. 21, 2005

(86) PCT No.: PCT/ES2005/000563
§ 371 (c)(1),
(2), (4) Date: Oct. 23, 2008

(87) PCT Pub. No.: WO2006/120260
PCT Pub. Date: Nov. 16, 2006

(65) Prior Publication Data
US 2009/0065054 A1    Mar. 12, 2009

(30) Foreign Application Priority Data

May 6, 2005  (ES) .................................. 200501211

(51) Int. Cl.
*F24J 2/10* (2006.01)
(52) U.S. Cl. ..................................... 126/689; 60/641.15
(58) Field of Classification Search .................. 126/689; 60/641.15
See application file for complete search history.

(56) References Cited

U.S. PATENT DOCUMENTS

| | | | |
|---|---|---|---|
| 3,130,084 A * | 4/1964 | Loring | 136/206 |
| 3,934,573 A * | 1/1976 | Dandini | 126/679 |
| 3,998,206 A * | 12/1976 | Jahn | 126/578 |
| 4,019,868 A * | 4/1977 | Sebacher et al. | 422/208 |
| 4,030,890 A * | 6/1977 | Diggs | 422/186 |
| 4,078,549 A * | 3/1978 | McKeen et al. | 126/606 |
| 4,171,876 A * | 10/1979 | Wood | 359/853 |
| 4,173,968 A | 11/1979 | Steward | |
| 4,214,572 A * | 7/1980 | Gonder | 126/577 |
| 4,285,667 A * | 8/1981 | Schmidt | 126/689 |
| 4,315,500 A * | 2/1982 | Gonder | 126/567 |
| 4,454,865 A | 6/1984 | Tammen | |
| 4,581,897 A * | 4/1986 | Sankrithi | 60/641.12 |
| 4,608,964 A * | 9/1986 | Russo | 126/688 |
| 4,743,095 A | 5/1988 | Dane | |
| 4,875,467 A * | 10/1989 | Murphy | 126/600 |
| 4,893,612 A * | 1/1990 | Dawson | 126/689 |
| 6,336,452 B1 * | 1/2002 | Tirey, Jr. | 126/690 |
| 2004/0247522 A1* | 12/2004 | Mills | 423/648.1 |

* cited by examiner

*Primary Examiner* — Kenneth Rinehart
*Assistant Examiner* — Jorge Pereiro
(74) *Attorney, Agent, or Firm* — DLA Piper LLP (US)

(57) ABSTRACT

A solar energy transfer system including a spherical dish measuring 0-100 meters in diameter, with stem measuring 0-100 meters in length (its length depends on the dish dimensions), perpendicular to the base of the dish. At the top of the stem is a spheroid where power concentration and transfer occurs by reflecting quantum and electromagnetic solar energy by means of reflecting material with the same curvature as the spherical dish.

2 Claims, 2 Drawing Sheets

SOLAR THERMAL POWER STATION

OBJECT OF THE INVENTION

The technical design study refers to obtaining renewable and clean power without polluting the environment, using the complete spectrum of solar energy.

The aim is to obtain a power station to supply with electricity the geographical area in which it is installed and make use of the quantum and electromagnetic solar spectrum power to obtain pure silicon (photovoltaic solar panels) and hydrogen, by means of tracking solar concentrators.

This plant is conceived for obtaining alternative power with solar energy as the free-of-cost raw material, without a negative impact on either the environment or safety.

BACKGROUND TO THE INVENTION

The main source of energy today is oil, a non-renewable raw material the transformation and use of which embraces a direct attack on the environment. The fact that it is non-renewable leads to constant crude oil price increases; as a result of the large number of pollutants its transformation generates and the final use of the fuel obtained (petrol, diesel, LPGs, etc.) to generate power, oil processing involves a significant environmental impact.

DESCRIPTION OF THE INVENTION

Solar Thermal Power Station:

The proposed solar thermal power station satisfactorily solves the above mentioned problems, producing a large amount of power from solar energy (at zero cost) without a negative impact on the environment.

This system uses the reflection and refraction of solar energy to produce other clean energies.

The invention is based on a spherical dish measuring 0-100 m in diameter; its spheroid is lined with a reflective material (mirror) and its curvature is the same as the one of the dish.

The spherical curvature of the dish reflects solar energy and concentrates it on a focal point at the dish radius. The dish centre is supported by a rod and attached to 4 metal towers equipped with servo-mechanisms that enable the dish to move with a solid angle of 45° towards the east and 45° west, optimising solar energy uptake.

Each dish is supported on a tank containing brine (or another fluid depending on the dish dimensions), embracing all the lower part of the dish. The fluid (in the case of brine) acts as a weight balance mechanism, facilitates mobility and retains the heat as energy source. The dish structure is provided with valves that open or close allowing the fluid to cross. This also avoids the structure to deform when rotating by means of balancing the forward thurst.

Each mirror has a 0-100 metre long stem (its length depends on the dish dimensions) perpendicular to the base of the dish. This stem consists of two high resistance steel concentric tubes. The inner ring between both tubes contains circuit pipes with high pressured cooling water, cold and warm, mechanically separated. This ring is provided with isolating materials. The inner space (cannon) houses conduits through which concentrated and high density quantum and electromagnetic energy flows to a silicon evaporation crucible. The cannon contains low-pressure helium gas to avoid combustion, oxidation and deterioration of materials.

At the top of the stem is a zirconium carbide spheroid energy exchanger lined with graphite. Its cavity contains low-pressure helium gas to avoid combustion, oxidation and deterioration of materials.

The focal point or focus is located inside this spheroid, with a FRESNEL lens on its top which, by reflection of concentrated energy, steers most of the quantum and electromagnetic energy through the stem cannon to an evaporation crucible which reaches a temperature higher than that at which silicon evaporates.

Following the Czochralski method, this enables us to obtain pure silicon monocrystals and 50 μm sheets which, adhered to a closed mesh, would ensure the continued production of photovoltaic solar panels.

The spheroid's graphite lining acts as a black body and absorbs the energy refracted by the lens, power that is radiated into the spheroid. This thermal energy heats up the cooling water circuit at the exchanger that lines the inner surface of the spheroid. In order to keep cooling water in flow state, it is driven at high pressure through the stem allowing it to host more heat than at atmosphere pressure. Once the cooling fluid is heated, it is driven to the decompression are to produce the steam that will move the turbines to generate electricity.

Part of the produced electricity is rectified to 2 V with a power rating of 45 Kwh to obtain 1 mol H2.

The metal structure, its assembly and civil works are correctly designed. The materials to be used at critical points are zirconium carbide (CZr), graphite and the FRESNEL reflective lenses.

All metal parts are protected against rusting.

To make this plant competitive, the number of modules to be installed must cover 30% of the optimum productivity whilst the crude oil barrel is 40$.

The best places to install these plants are those with a solar radiation in excess of 3.5 KW/day and an annual mean of over 4.6 KW/day.

According to our R&D study, they ensure total electric independence, thus contributing to the highest development.

Important Note:

For this power to be transported without affecting the environment, it necessarily requires the use of the electric conductor patented in Spain with dossier No. P200501210.

DESCRIPTION OF DRAWINGS

In order to complete this description and to better understand the feature of the invention, attached hereto is a set of drawings aimed at illustrating and not limiting its comprehension where the following items are represented.

Figure 1:
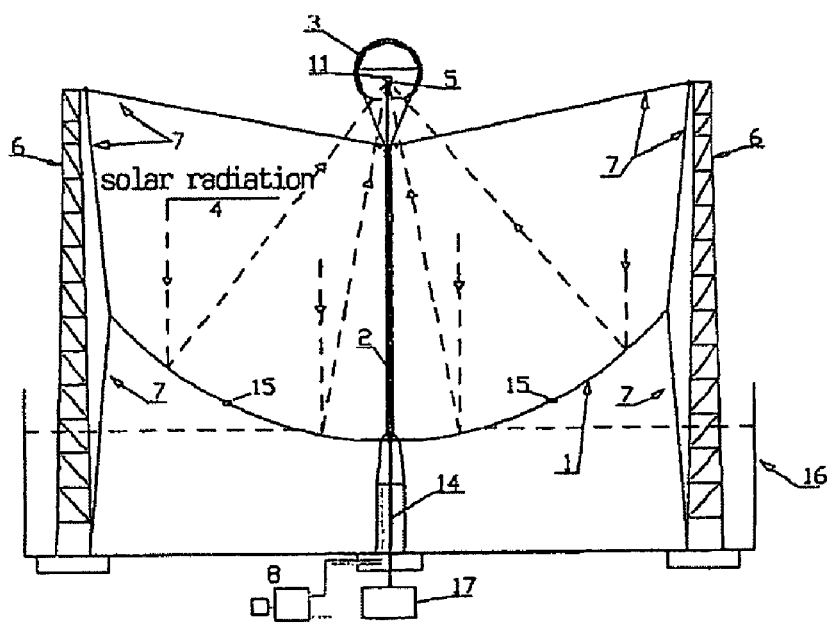
FIG. 1.—Cross section of a spherical dish (1), with its stem (2), and spheroid (3), representing the incidence of solar radiation (4) on a focus (5) owing to the curvature of reflecting material lining the dish. It also shows two of the four stems (6) of the fixing and movement system, including the steel tension wires (7) linked to the stem (2) and to the dish (1). At the lower part, below the structure and the fluids tank (16) are the turbines, generators (8) and the silicon evaporation area (17), where energy reaches along the cannon (15).
Figure 2:
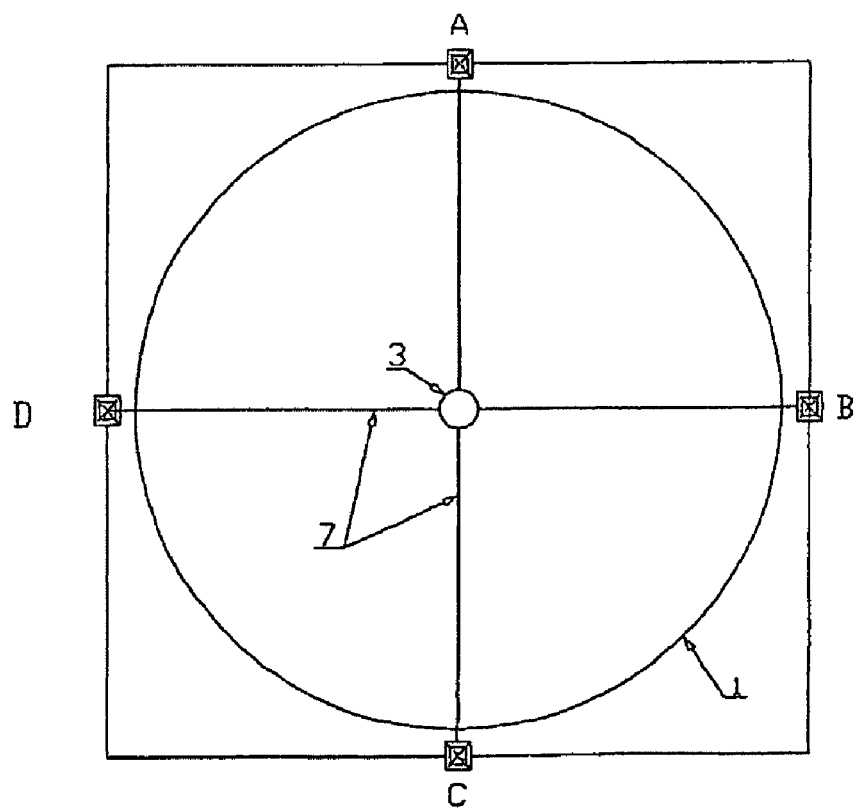
FIG. 2.—Ground plan of the system (spherical dish (1), stem and spheroid (3)), the location of the four metal towers (A, B, C and D) that hold and guide the system by means of tension wires (7) and servomotors to control its movement. It optimises the solar energy uptake by rotating 45° towards east and 45° west.
Figure 3:
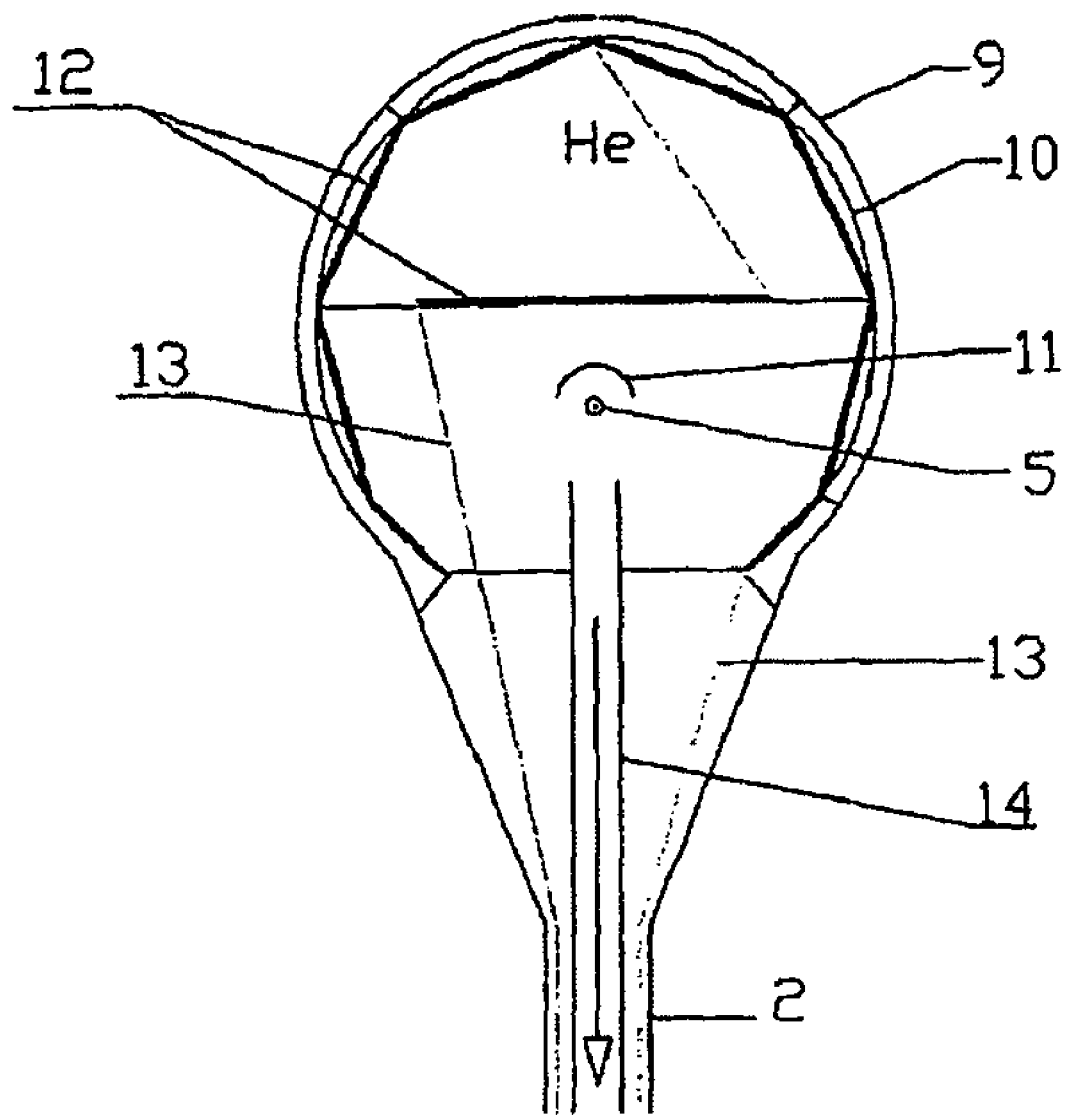
FIG. 3.—Cross section of a spheroid. The outer dish is a zirconium carbide (9) screen lined with graphite (10). The Fresnel lens (11) is located inside this spheroid, above the focus (5) which, by concentration and reflection, steers most of the energy through the cannon (14) along the stem (2) to a silicon evaporation crucible.

Inside the spheroid exchanger, which consists of a black galvanized iron spiral (12), flows high pressured cooling water (13), hot and cold. The spheroid contains low-pressure helium gas to avoid combustion, oxidation and deterioration of materials.

The invention claimed is:

1. An energy transfer system by means of tracking solar concentrators with a spherical dish of 0-100 meters in diameter, stem of 0-100 meters in height, spheroid, fixing and movement system and solar tank wherein said stem is provided so as to be perpendicular to a base of the spherical dish, and wherein said stem consists of two high resistance steel concentric tubes in which inside of conduits of the inner ring between both tubes flows high pressured cooling water, cold and warm, mechanically separated, the inner ring is filled with isolating material and an inner space thereof houses the conduits through which concentrated and high density quantum and electromagnetic energy flows to a silicon evaporation crucible, and said inner space contains low-pressure helium gas to avoid combustion, oxidation and deterioration of materials.

2. The energy transfer system according to claim 1, wherein said spheroid consists of an outer screen of zirconium carbide lined with graphite that acts as black body, inside of said spheroid and on a focus thereof is provided with a Fresnel lens that reflects quantum and electromagnetic energy concentrated in the focus, which flows along the inner space through the stem to a silicon evaporation crucible to obtain photovoltaic solar panels, and wherein said spheroid contains low-pressure helium gas to avoid combustion, oxidation and deterioration of materials and to absorb the radiation reflected by the lens so that said spheroid heats cooling water flowing along an exchanger that lines an inner surface of the spheroid, and high temperature water is conducted through the stem to a decompression area, so that once transformed into steam the high temperature water produces electric power by means of turbines.

\* \* \* \* \*